Jan. 2, 1934.  W. H. MUSSEY  1,941,995
RUBBER SPRING
Filed Aug. 13, 1930  2 Sheets-Sheet 1

INVENTOR:
WILLIAM H. MUSSEY.
by Oscar Hochberg.
his ATTORNEY.

Jan. 2, 1934.                    W. H. MUSSEY                    1,941,995
                                 RUBBER SPRING
                              Filed Aug. 13, 1930              2 Sheets-Sheet 2

INVENTOR:
WILLIAM H. MUSSEY.
by Oscar Hochberg.
his ATTORNEY.

Patented Jan. 2, 1934

1,941,995

UNITED STATES PATENT OFFICE 1,941,995

RUBBER SPRING

William H. Mussey, Chicago, Ill., assignor, by mesne assignments, to Pullman Car & Manufacturing Corporation, a corporation of Delaware Application August 13, 1930. Serial No. 474,965

4 Claims. (Cl. 213—40)

The invention relates to rubber spring units designed for use in railway car draft gear and buffing devices, having two or more rubber elements of concentric or other form secured to opposite sides of a metal supporting plate, and more particularly to the substitution for one of the rubber elements on each side of the supporting plate, of a metal element of substantially less thickness than said rubber elements, for limiting the compression of said rubber elements, and therefore of the spring units, a predetermined amount.

The invention has for its principal object the provision of means whereby the shocks, to which railway car draft gear and buffing devices are subjected, will be successively distributed from an outer main column of rubber to one or more inner columns of rubber, each of which is relatively shorter than the other, thereby offering a progressively increasing resistance to stresses imposed thereon, thence, when excessive, through the medium of a metal column, to the car underframe.

Heretofore in rubber spring groups offering a graduated resistance to compression, due to the peculiar properties of rubber, there was practically no limitation to the compression of the individual spring units, and the relatively weaker members of the group were compressed practically to infinity before those of the major group of springs were materially brought into use, causing the rapid deterioration thereof and thereby defeating the purpose for which the progressively increasing resistance to compression was originally intended.

In the present invention, however, this difficulty has been overcome by the use of the metal elements above referred to, which prevent the excessive compression of the several spring units.

The foregoing and other objects are attained by the mechanism illustrated in the accompanying drawings, in which Figure 1 is a front elevational view of a rubber spring, constructed in accordance with the present invention, showing a central vertical section through the same, disposed within said view;

In the practice of the invention it is customary to arrange the springs in series to form a column or columns, defined by the several rubber and metal rings and bars of successive spring units, for resisting the longitudinal compression tendencies of the draft gear or buffing devices in which they are used, and to positively prevent the abnormal compression of said springs. In the accompanying drawings, 10 represents a supporting plate, to which the rubber shock absorbing means 12 is attached in any suitable manner, preferably as shown, by molding a number of concentric rings on opposite sides of the supporting plate and forming the rubber of said rings through the perforations 11 in the supporting plate 10 during the molding process.

Figure 1:
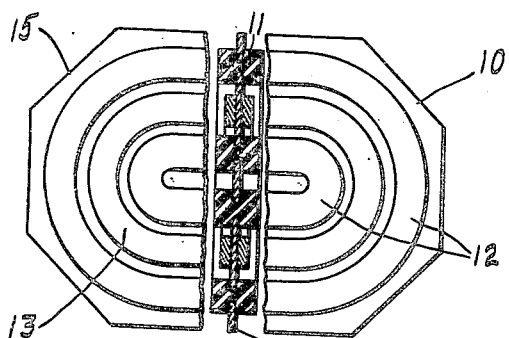
Figure 2:
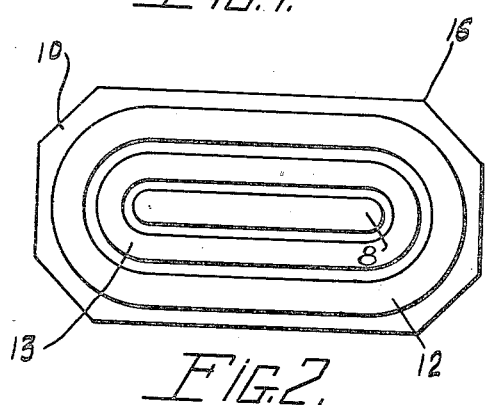
Figure 2 is a front elevational view of a preferred form of rubber spring.
Figure 5:
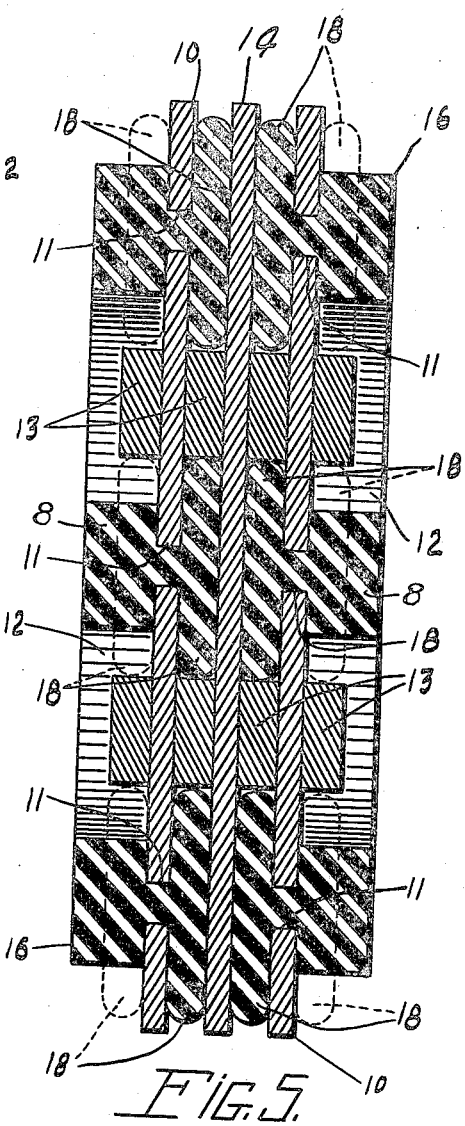
Figure 5 is an enlarged vertical sectional view through the spring shown in Figure 2.

As indicated in Figures 1, 2, and 5, limiting stops 13 are provided, which are secured to the supporting plates 10 and are preferably in the form of metal rings concentric with the rubber rings 12, and secured by welding or sweating them to said plates, or by any other suitable means, or integral with said plates, and their depth determined by the amount of travel necessary in the draft or buffing devices in which they are to be used, and by the amount of space necessary to allow the mass of the rubber elements to spread freely within permissible limits.

The rubber elements 12 and limiting stops 13 are so proportioned relatively that under compression, the rubber mass will be prevented from spreading over the stops and between said stops and adjacent separator plates 14. In its fully compressed state, as indicated at 18 in Figure 5, the rubber is not crowded or restricted by adjoining concentric rubber rings, as in springs of this type heretofore constructed, but is allowed to flow freely during compression, and prevented from being unduly compressed by the contact of stops 13 with said separator plates 14, which in turn, transmit the shock from one spring unit to each succeeding spring unit in the group. The spring unit shown in Figures 3 and 4 employs a central elongated metal stop bar 9 in place of the metal rings 13 of Figures 1 and 2.

Figure 6:
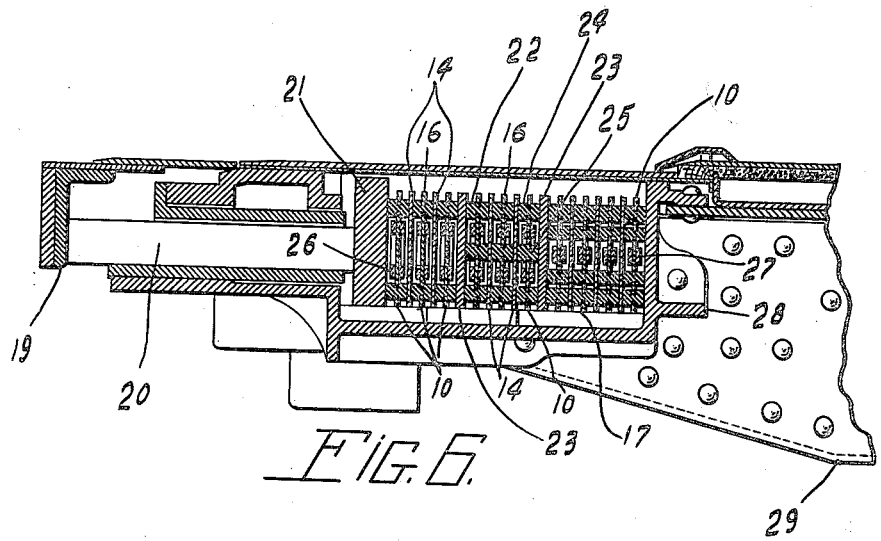
Figure 6 is a central longitudinal section through a railway car buffing device equipped with the present invention.

The invention may be adapted for use in a railway car buffing device of the type illustrated in Figure 6 in which 19 represents a buffer angle, 20 a center buffer stem, and 21 a follower, through which the shocks resulting from the surging and lagging movements of the cars in a train, are transmitted to the buffing mechanism 22.

Figure 3:
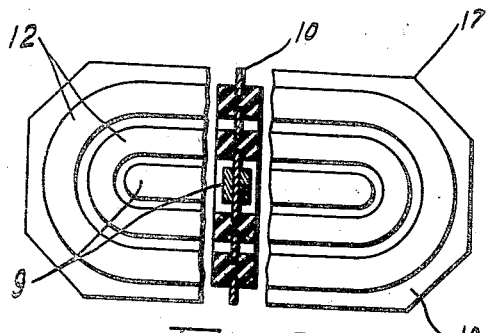
Figure 3 is a view similar to Figure 1, showing a slightly modified form of the invention.
Figure 4:
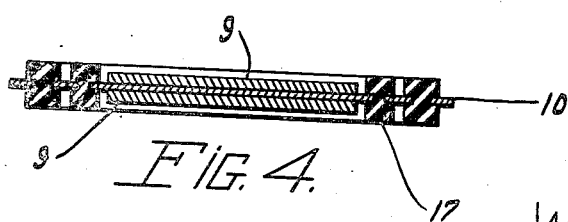
Figure 4 is a central horizontal section through the spring shown in Figure 3.

In this embodiment, the spring units are arranged in three distinct groups, respectively comprising a number of the spring units 16 of Figures 2 and 5, with the central rubber bar 8 omitted, a number of the spring units 16 with rubber bar 8, and a number of the spring units 17 of Figures 3 and 4 with metal bar 9, each group being of relatively and progressively increasing capacity, and separated by rigid distributor plates 23 of heavier material than the separator plates 14, to prevent buckling when the excess load on outer tubular column of rubber 24 is transferred to the inner column of rubber 25, and from the tubular column of metal 26, to the metal column 27, thence through the buffer casting 28 to the car underframe 29, when the forces developed exceed the capacity of the rubber columns to absorb.

Figure 7:
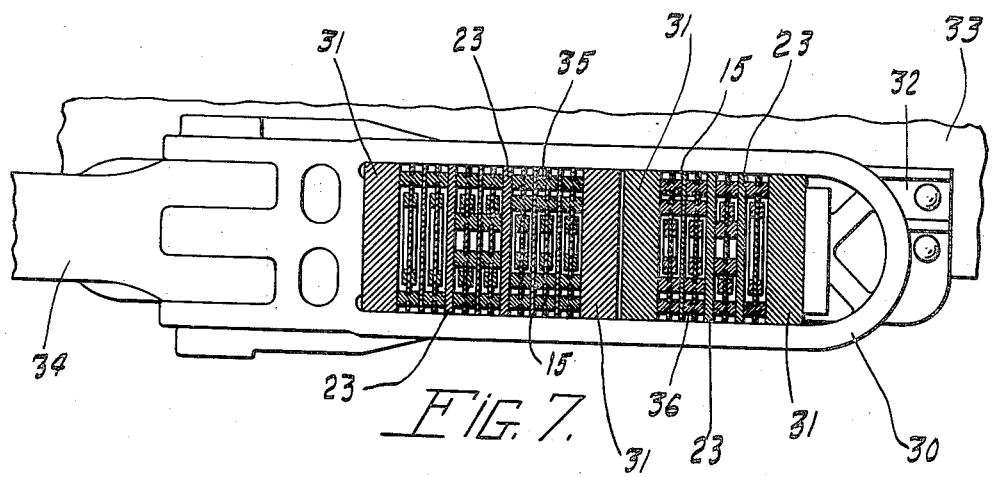
Figure 7 is a central longitudinal section through a railway car draft gear equipped with the present invention.

In Figure 7 the invention is embodied in a railway car draft gear, in which the usual draft yoke 30 is supported upon followers 31, which rest on the draft lugs 32 attached to the car underframe 33. The lugs 32 being stationary, buffing shocks coming from the coupler 34 will be absorbed by the front group of springs 35, and shocks in draft will be absorbed by the relatively light rear group 36; said groups being composed of a number of the spring units 15 shown in Figure 1, of varying capacities. These groups working independently of one another and being arranged in series, will operate on the same principal as the buffing mechanism 22, above described; the excessive shocks being transferred from the outer column to the inner and ultimately transmitted to the car underframe through the lugs 32.

From the foregoing it will be gathered that there has been provided, a rubber spring of the class described, having means for positively limiting the compression thereof a predetermined amount, and capable of relieving the individual spring units of any excess pressure and transferring it to the car underframe, thereby preventing rapid deterioration caused by the excessive pressures to which they were hitherto subjected, and which is adaptable to the rubber spring groups now in use at a minimum of labor and expense.

What I claim is:—

1. In draft or buffing mechanism comprising rubber spring units of relatively different and like resistance values, metal plates separating units of like individual capacities, relatively rigid distributor plates interposed mediate contiguous units having relatively different resistance values, and rigid means upon opposite sides of and integral with the respective spring units for limiting compression thereof, certain of said means having areas superposed upon and in projected thrust relation with the rubber areas of units upon the other side of said distributor plates.

2. In draft or buffing mechanism, the combination comprising a plurality of rubber spring units having like individual capacities, a plurality of rubber spring units of relatively different capacities, plates separating units of the first mentioned order, relatively rigid distributor plates between contiguous units of relatively different capacities, and rigid means upon opposite sides of and integral with the respective spring units for limiting compression thereof, certain of said means having areas superposed upon and in projected thrust relation with the rubber areas of units upon the other side of said distributor plates.

3. In a draft and buffing mechanism, a plurality of rubber spring units having different individual resistance values arranged in series of progressively increasing capacity and comprising each a metal plate having one or more rubber elements secured to respectively opposite faces thereof, relatively shallow metal stop elements carried by said plates and concentrically arranged with respect to the rubber elements and having areas superposed upon and in projected thrust relation with the rubber areas of contiguous units of higher resistance value, and rigid distributor plates between units of different individual capacities adapted to transfer excess loads from the lower capacity units to the higher.

4. In a draft and buffing mechanism including a pair of followers, a pair of rubber spring units of relatively different capacities and comprising each a metal supporting plate having one or more rubber elements secured to respectively opposite faces thereof, relatively shallow metal stop elements carried by said plates and concentrically arranged with respect to the rubber elements, the stop elements on one of said units having areas superimposed upon and in projected thrust relation with the rubber areas of the other unit, and a plate separating said units.

WILLIAM H. MUSSEY.